United States Patent [19]

Tamaru

[11] Patent Number: 4,707,833
[45] Date of Patent: Nov. 17, 1987

[54] FAULT-COMPENSATING DIGITAL INFORMATION TRANSFER APPARATUS

[75] Inventor: Kiichiro Tamaru, Tokyo, Japan

[73] Assignee: Kabushiki Kaisha Toshiba, Japan

[21] Appl. No.: 724,465

[22] Filed: Apr. 18, 1985

[30] Foreign Application Priority Data

Apr. 19, 1984 [JP] Japan .................................. 59-79128

[51] Int. Cl.⁴ ............................................. G06F 11/00
[52] U.S. Cl. ........................................ 371/15; 371/11; 371/25
[58] Field of Search ...................... 371/15, 11, 16, 20, 371/21, 25; 364/200, 900

[56] References Cited

U.S. PATENT DOCUMENTS

| | | | |
|---|---|---|---|
| 4,183,461 | 1/1980 | Sato | 364/200 |
| 4,298,980 | 11/1981 | Hajdu | 371/25 |
| 4,375,635 | 3/1983 | Leow | 371/25 |
| 4,433,412 | 2/1984 | Best | 371/25 |
| 4,454,594 | 6/1984 | Cage | 364/900 |
| 4,493,077 | 1/1985 | Agrawal | 371/25 |
| 4,500,958 | 2/1985 | Manton | 364/200 |
| 4,602,210 | 7/1986 | Fasang | 371/15 |

*Primary Examiner*—Michael R. Fleming
*Attorney, Agent, or Firm*—Finnegan, Henderson, Farabow, Garrett & Dunner

[57] ABSTRACT

A digital information transfer apparatus includes N shift registers (1 through N) for storing digital information supplied to and from N respective function modules, and a common bus connected to the shift registers for parallel transfer of digital information. The shift registers are serially connected by a scan path to form a large scale shift register. An error detector in the transferring control circuit detects a failure on the common bus, and supplies a serial output signal of the Nth shift register to the 1st shift register. The processing circuit of the 1st function module rotates the contents of the 1st to Nth shift registers, through the scan path.

8 Claims, 4 Drawing Figures

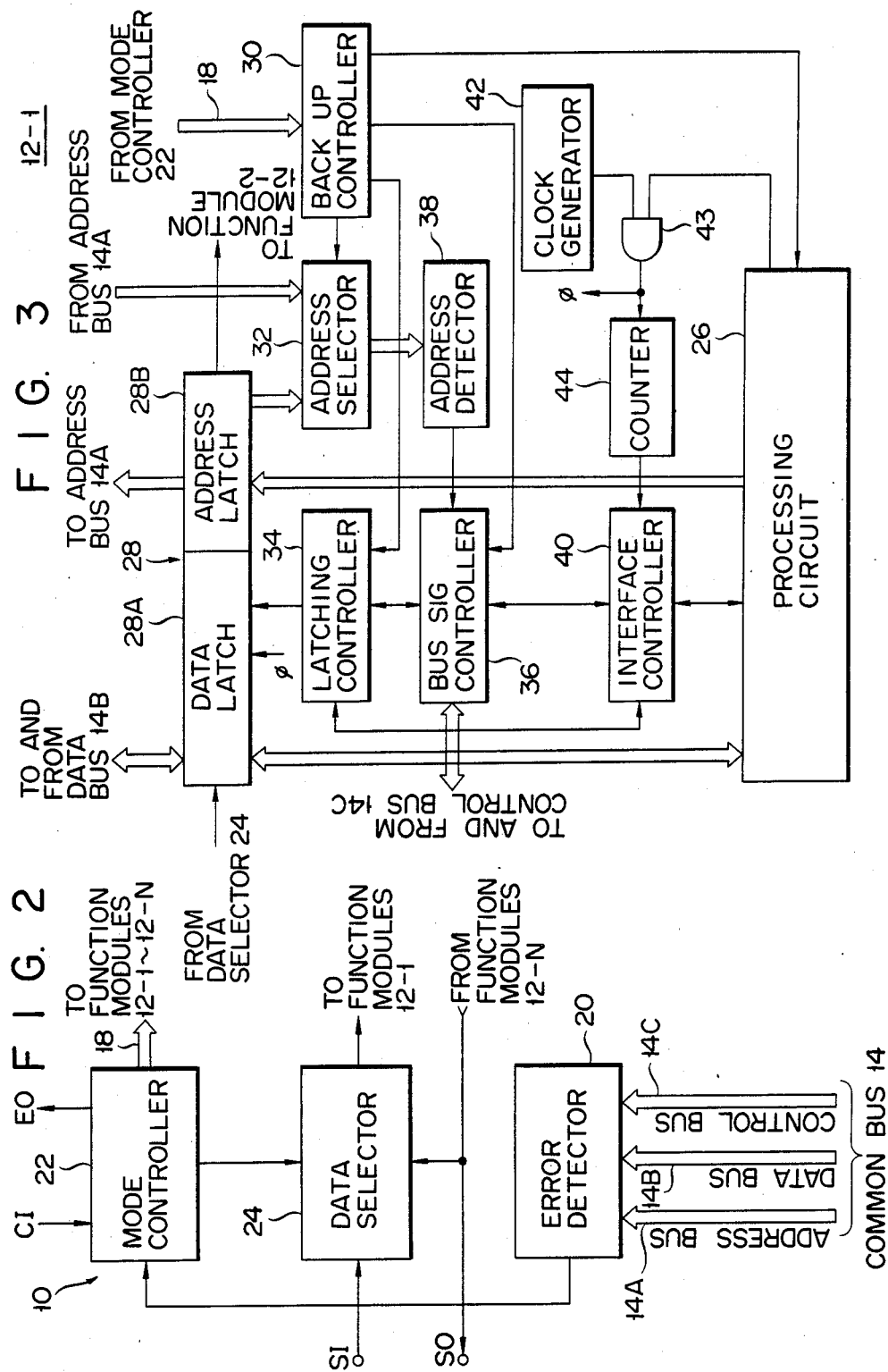

FAULT-COMPENSATING DIGITAL INFORMATION TRANSFER APPARATUS

BACKGROUND OF THE INVENTION

The present invention relates to a fault-compensating digital information transfer apparatus and, more particularly, to a fault-tolerant digital information transfer apparatus for transferring digital information among function modules fabricated on a semiconductor chip.

As an example of the prior art, consider a case in which the function modules, e.g. CPUs and I/O devices, of a computer system have intelligent processors. Normally, digital information is transferred in parallel among the function modules over a common bus. Noise occurring in the common bus occasionally invalidates the digital information during this transfer. A number of design measures have been taken in the past to identify and correct these transfer errors. For example, one such measure includes transferring the same data repeatedly. Another measure uses error correction data (e.g., one or more parity bits) attached to part of each data word. These measures can effectively check minor isolated transfer errors, but cannot accomodate or correct major transfer errors arising, for example, from the disconnection of the common bus from the function modules.

To cope with such major errors, one recently proposed approach uses a first common bus and a second or backup common bus in the computer system. In this approach, if the first common bus is disconnected, it is replaced by the second or backup common bus. As a result of this replacement, the transfer operation is rapidly returned from a nonoperative state to an operative state.

Recent advances in semiconductor fabrication technology have enabled the function modules to be fabricated as a single LSI device on a single LSI chip, rather than a printed circuit board. However, fabrication of both the first and second common buses on the same semiconductor chip is undesirable because the dual common buses occupy a large area on the semiconductor chip. The result of placing both common buses on a single chip is that a correct, secure transfer of data occurs, but the remaining area of the chip is insufficient for fabrication of the function modules. This problem can be avoided by using a larger semiconductor chip, but this approach increases the difficulty of further miniaturization of the LSI chip.

SUMMARY OF THE INVENTION

Accordingly, an object of the present invention is to provide a fault-tolerant digital information transfer apparatus having relatively compact size which completely eliminates interruption of the digital information transfer process caused by a failure of the common bus.

Additional objects and advantages of the invention will be set forth in part in the description which follows, and in part will be obvious from the description, or may be learned by practice of the invention. The objects and advantages of the invention may be realized and attained by means of the instrumentalities and combinations particulary pointed out in the appended claims.

To achieve the objects and in accordance with the purpose of the invention, as embodied and broadly described herein, a fault-tolerant digital information transfer apparatus for transferring information to and from each of a plurality of function modules is provided, the apparatus comprising, common bus means coupled to each of the function modules for transferring information to and from each of the function modules, shift register means including a plurality of register circuits for temporarily storing information, each of the register circuits being coupled to the common bus means and being coupled in series to a respective one of the function modules, and each of the register circuits except a last one of the register circuits being coupled in series to a sequential one of the register circuits, each of the register circuits being adapted to temporarily store information for one of the function modules. The apparatus further comprising detecting means coupled to the common bus means for detecting a failure of the common bus means and generating an error signal in response to the failure detection, and control means coupled to the common bus means, to a first and last one of the register circuits, and to the detecting means, for causing information to be transferred to and from each of the function modules in parallel over the bus means during absence of the error signal, and for causing information to be transferred to and from the function modules in series in response to the error signal.

BRIEF DESCRIPTION OF THE DRAWINGS

FIG. 2 is a block diagram illustrating a transfer control circuit 10 as shown in FIG. 1;

FIG. 3 is a block diagram illustrating function module 12-1 as shown in FIG. 1.

DETAILED DESCRIPTION OF THE PREFERREDD EMBODIMENT

Figure 1:
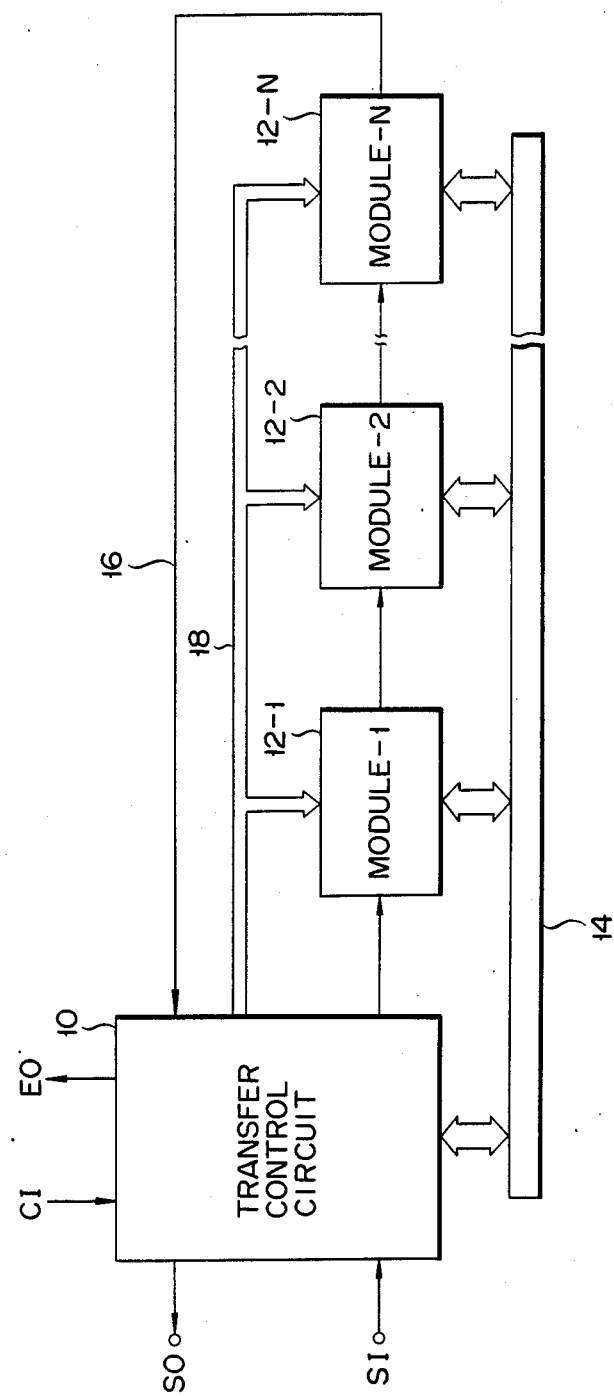
FIG. 1 is a block diagram of a preferred embodiment of the digital information transfer apparatus of the present invention.
Figure 4:
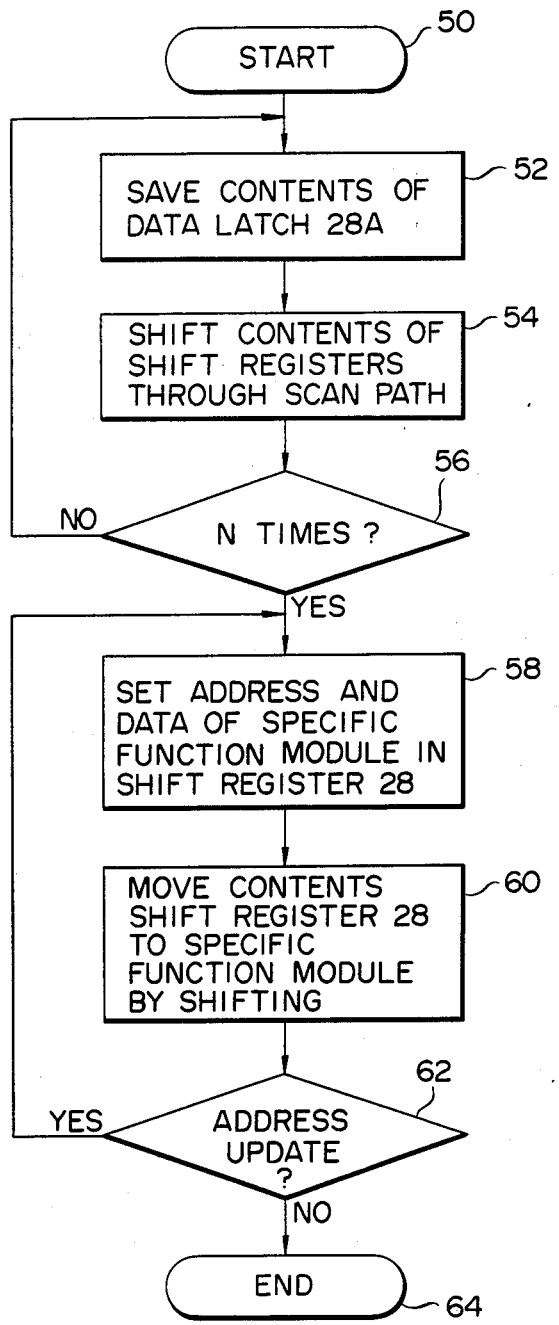
FIG. 4 is a flowchart illustrating the preferred operation of the processing circuit shown in FIG. 3.

A presently preferred embodiment of the invention will now be described with reference to FIGS. 1 to 4. FIG. 1 shows a block diagram of a digital information transfer apparatus according to the preferred embodiment. The information transfer apparatus has a transfer control circuit 10 for controlling the transfer of digital information among N function modules 12-1 to 12-N. The transfer control circuit 10 and the function modules 12-1 to 12-N, together with a common bus 14 and a scan path 16, are fabricated on a semiconductor chip. The function modules 12-1 to 12-N each have their own addresses. The digital information includes an address signal, data signal, and a control signal. The function modules 12-1 to 12-N are connected to the common bus 14 and, through the common bus, digital information is transferred in parallel among the function modules 12-1 to 12-N. The function modules 12-1 to 12-N are connected in series by means of the scan path 16. Through this path, the function modules 12-2 to 12-N receive digital information from the function modules 12-1 to 12-(N−1) respectively. The function module 12-1 is connected to the transfer control circuit 10 to serially receive digital information from it, as the first stage of the function modules 12-1 to 12-N. The function module 12-N is connected to the transfer control circuit 10 to serially provide digital information to transfer control circuit 10 as the last stage of the function modules 12-1 to 12-N. The transfer control circuit 10 is connected to each of the function modules 12-1 to 12-N by a control line pair 18 to provide control data.

The present invention as described here is capable of operating in a normal operation mode, a test mode, and a transfer error mode. The transfer control circuit 10 receives an instruction CI to designate the test mode or the normal mode, and generates an error indication signal EO to indicate a failure of the common bus 14, i.e., the transfer error mode. In the test mode, which is used to check the function modules 12-1 to 12-N, diagnostic data are externally supplied to a serial input terminal SI. The function module 12-1 receives the diagnostic data sent from the transfer control circuit 10 through the scan path 16. A serial output terminal SO is connected to the transfer control circuit 10 to provide digital information from the function module 12-N to external circuitry (not shown) during the test and transfer error modes, as described below.

FIG. 2 shows the transfer control circuit 10 of the preferred embodiment in detail. The transfer control circuit 10 includes an error detector 20, a mode controller 22, and a data selector 24. The error detector 20 which is provided to detect transfer errors, is connected to an address bus 14A, a data bus 14B, and a control bus 14C included in the common bus 14, as shown in FIG. 1. An error signal is supplied to the mode controller from the error detector 20. The mode controller 22 generates a 2-bit control word corresponding to the combination of the error signal and an instruction CI. This control word is supplied to the function modules 12-1 to 12-N through the control line pair 18. The mode selector 22 supplies the error signal to external circuitry (not shown) as the failure indication signal EO. The mode selector 22 has an OR gate (not shown) for generating a control signal according to the instruction CI and the error signal. The control signal is used for controlling the data selector 24.

The data selector 24 includes a first terminal connected to the serial input terminal SI, and a second input terminal for receiving the output signal of the function module 12-N through the scan path 16. One of the input signals of the first and second input terminals is selected according to a command from the mode controller 22. The data selector 24 includes two AND gates, an OR gate, and an inverter (not shown). The output signal of the data selector 24 is supplied to the function module 12-1 through the scan path 16. The second input terminal of the data selector 24 is also connected to the serial output terminal SO.

FIG. 3 shows the details of the function module 12-1. The function module 12-1 includes a processing circuit 26 for processing specific data and a shift register 28 for storing digital information, i.e. addresses and data, supplied to and from the processing circuit 26. The shift register 28 includes a data latch 28A and an address latch 28B. The data bus 14B is connected in parallel to the processing circuit 26 via the data latch 28A. Similarly, the address bus 14A is connected in parallel to the processing circuit 26 via the address latch 28B. The input terminal of the shift register 28 is connected through the scan path 16 to the output terminal of the data selector 24. The output terminal of the shift register 28 is connected through the scan path 16 to the input terminal of the corresponding shift register in the function module 12-2 (not shown).

A backup controller 30 controls an address selector 32, a latching controller 34, a bus signal controller 36, and the processing circuit 26, in response to control data. The address selector 32 receives address signals from the address latch 28B and address bus 14A, and selectively applies the address signals to an address detector 38. The contents of the address latch 28B are supplied to the address detector 38 through the address selector 32 when the test mode or when a transfer error occurs. In modes other than these, the address detector 38 receives the address on the address bus 14A through the address selector 32. The address detector 38 produces an accept signal when the address from the address selector 32 is coincident with the specific address assigned to the function module 12-1. The bus signal controller 36 detects the input/output request on the control bus 14C in response to the accept signal of the address detector 38, and controls the latching controller 34 in accordance with the request on the control bus. The latching controller 34 and the bus signal controller 36 are controlled by an interface controller 40 to transfer address and data between the processing circuit 26 and the shift register 28. Accordingly, the bus signal controller 36 transfers the input/output request to the data bus 14B. The latching controller 34 and the bus signal controller 36, each being coupled to and under the control of the backup controller 30, are prohibited from latching addresses data on the common bus 14 when in the test mode or when a transfer error occurs. A clock generator 42 for generating shift pulses $\phi$ is coupled to the input of an AND gate. The shift pulses $\phi$ are selectively transferred from the clock generator 42 to the shift register 28 and a counter 44 by way of the AND gate 43, which is under the control of the processing circuit 26. The counter 44 produces an enable signal each time it detects a predetermined number of the shift pulses $\phi$ (i.e., the number corresponding to bits in the shift register 28). The enable signal is supplied to the interface controller 40, which causes the processing circuit 26 to ignore the contents in the data latch 28A during periods when the counter 44 produces no enable signal. The processing circuit 26 responds to a signal from the backup controller 30 to stop the task processing but to execute, for example, the control of the AND gate 43.

The remaining function modules 12-2 to 2-N each have the same circuit arrangement as the function module 12-1 as mentioned above, except that these function modules do not have a clock generator and AND gate corresponding to those of the function module 12-1. The shift registers in the function modules 12-2 to 12-N are connected in series through the scan path 16, and receive the shift pulses $\phi$ from the AND gate 43. The shift operation of the shift registers in the function modules 12-2 to 12-N are controlled by the processing circuit 26 in the function module 12-1 rather than by the processing circuits in the function modules 12-2 to 12-N.

The operation of the preferred embodiment will now be described. Upon receipt of an externally applied instruction CI, the normal operating mode is initiated. The mode controller 22 generates control data indicating the normal operating mode, and controls the data selector 24 in accordance with the instruction. Under this control, the output signal from the shift register of the function module 12-N is not supplied through the data selector 24 to the shift register in the function module 12-1. The control data is supplied from the mode controller 22 to the backup controllers of the function modules 12-1 to 12-N. In the function module 12-1, the backup controller 30 controls the address selector 32, the latching controller 34, and the bus signal controller 36 in accordance with the control data. The adddress selector 32 applies the address signal on the address bus 14A to the address detector 38. When the address input to the address detector 38 is coincident with the specific address of the function module 12-1, the accept signal is supplied from the address detector 38 to the bus signal controller 36. The bus signal controller 36 recognizes the input request on the control bus 14C, and controls the latching controller 34. At this time, the shift register 28 latches the data on the data bus 14B, and supplies the data in parallel to the processing circuit 26. When the address and the data supplied from the shift register 28 are transferred in parallel to the function modules 12-2 to 12-N, the processing circuit 26 controls the latching controller 34 and the bus signal controller 36 through the interface controller 40. The shift register 28 latches the address and the data as generated by the processing circuit 26. The address and the data latched by the shift register 28 are transferred in parallel to the function modules 12-2 to 12-N, through the address buses 14A and 14B. The bus signal controller 36 produces a control signal in synchronism with the output operation of the shift register 28. This control signal is transferred to the function modules 12-2 to 12-N through the data bus 14C.

In the normal operating mode, when a transfer error occurs in the common bus 14 due to a disconnection, the error detector 20 detects this error and generates an error signal. When the mode controller 22 receives the error signal, the data selector 24, under the control of the mode controller 22, transfers the output data of the shift register in the function module 12-N to the shift register 28 in the function module 12-1. The shift registers in the function modules 12-1 to 12-N are looped through the data selector 24. The mode controller 22 supplies a failure indication signal EO to the external circuitry, and generates control data indicating an error mode.

In the error mode control data is supplied to the backup controllers of the function modules 12-1 to 12-N. The address selector 32 is controlled according to the control data from the backup controller 30, and supplies the contents of the address latch 28B to the address detector 38. The backup controller 30 applies a command to inhibit the parallel input/output between the address bus 14A and the data bus 14B, and the shift register 28, and also applies a command to the bus signal controller 36 to inhibit the parallel input/output to and from the address bus 14A. At this time, parallel input/output between the processing circuit 26 and the shift register 28 is not inhibited. When the contents of the address latch 28B are coincident with the specific address of the function module 12-1, the accept signal is supplied from the address detector 38 to the bus signal controller 36. The bus signal controller 36 responds to the accept signal by controlling the shift register 28 through the latching controller 34. The contents of the data latch 28A are then supplied to the processing circuit 26.

When the output address of the processing circuit 26 is transferred to the other function modules 12-2 to 12-N, the processing circuit 26 controls the latching controller 34 through the interface controller 40. Under the control of this latching controller 34, the address and the data in the processing circuit 26 are latched in the shift register. The contents of the shift register 28 are transferred serially to the function modules 12-2 to 12-N, respectively, through the scan path by the shifting operation of the shift registers in the function modules 12-1 to 12-N. This shifting operation is controlled by the processing circuit 26. When the control data indicating an error mode are supplied to the backup controller 30 in the function module 12-1, the backup controller 30 interrupts the task processing of the processing circuit 26 and causes the processing circuit 26 to execute interrupt processing, for example, according to a flowchart shown in FIG. 4.

The interrupt processing starts in step 50. In step 52, the processing circuit 26 stores the contents in the data latch 28A of the shift register 28, and in step 54 directs the AND gate 43 to output the shift pulses $\phi$ equal in number to bits of the shift register 28. All of the contents of the shift registers in the function modules 12-1 to 12-N are circularly transferred to the shift registers of the function modules 12-2 to 12-N and 12-1, respectively, through the scan path 16. Note that the contents of the shift register of the function module 12-N is transferred to the shift register 28 of the function module 12-1 via the data selector 24.

In step 56, the number of times the contents of the data latch 28A have been saved is checked to determine whether it has reached N (i.e. the number of the function modules 12-1 to 12-N). If these contents have been saved less than N times, the contents of the data latch 28A are saved again in the processing circuit 28 according to step 52. If the contents have been stored N times, step 58 is executed. As a result, the failure of the common bus 14 causes of the data stored in the shift registers of the function modules are evacuated into the memory in the processing circuit 26.

The processing circuit 26 then generates address and data words to designate a specific function module, as shown in step 58. The processing circuit 26 controls the shift register 28 to store the address and data words. Accordingly, the contents of the shift register 28 are transferred to the shift register of the designated function module in step 60. The processing circuit 26 controls the AND gate 43 to supply the number of shift pulses $\phi$ necessary for this transfer to the shift register 28. In this designated function module, the address is detected and a processing command in the data is executed. In step 62, the processing circuit 26 determines whether a transfer operation by another processing circuit is necessary. If it is necessary (YES), the appropriately updated address and data words are transferred as a processing command to the shift register 28 according to step 58. If further transfers are unnecesary (NO), the processing ends.

In the test mode, the mode controller 22 controls the data selector 24 in response to the test mode instruction as diagnostic data are supplied to the serial input terminal SI. The data selector 24 supplies the diagnostic data supplied at the serial input terminal SI to the shift register 28 in the function module 12-1, still under the control of the mode controller 22. The shift registers in the function modules 12-1 to 12-N are supplied at this point with the shift pulses $\phi$ from the clock generator 42 through the AND gate 43. The processing circuit 26 controls the AND gate 43 to supply the shift pulses $\phi$ in synchronism with the diagnostic data. For example, when the diagnostic data are provided for testing the function module 12-2, a number of shift pulses $\phi$ (twice the number of bits in the shift register 28) are supplied to the function modules 12-1 to 12-N (the number of bits in each of these shift registers is preferably equal). The diagnostic data are then serially transferred through the scan path 16 and are stored in the shift register of the function module 12-2. The processing circuit in the function module 12-2 receives the diagnostic data from the shift register, and sets the response data in the shift register. Afterwards, a plurality of pulses equal in number to the number of the shift pulses $\phi$ (N−1) times the number of the bits in the shift register 28 is supplied to the function modules 12-1 to 12-N. The contents of the shift register in the function module 12-2 are transferred through the scan path 16 to the serial output terminal SO, and supplied to external circuitry. In the test mode, the processing circuit 26 of the function module 12-1 does not perform the processing described above for transfer error occurence. This is due to the control of the backup controller 30. However, other circuits in the function modules 12-1 to 12-N transfer the test data and the address of the processing circuit 26 as described above for transfer error occurrences.

As may be seen from the foregoing description, failure of the common bus 14 causes the shift registers in the function modules 12-1 to 12N to be looped through the data selector 24. As this occurs, the contents of the shift registers are rotated through the scan path 16, and moved to memory locations in the processing circuit 26. Thus, even if a failure occurs in the common bus 14, the transfer of digital information is not completely stopped. Processing can be maintained by means of the series transfer through the scan path 16. In addition, high priority information can be removed through the serial output terminal SO, if necessary. When a backup device is connected to the serial output terminal SO to receive the output signal, the computer system can quickly be restarted.

The present invention allows the chip area of the semiconductor chip to be more effectively used than the case where dual common buses are fabricated on the same semiconductor chip. The circuit necessary for serially transferring the digital information can be made small, thus not requiring a large area on the semiconductor chip. In this respect, the digital information transfer apparatus is suitable for incorporation into LSI devices having high integration density.

It will be apparent to those skilled in the art that various modifications and variations can be made in the fault-tolerant digital information transfer apparatus of the present invention. Thus, it is intended that the present invention cover the modifications and variations of this invention provided they come within the scope of the appended claims and their equivalents.

What is claimed is:

1. A digital information transfer apparatus for transferring information to and from each of a plurality of function modules, said apparatus comprising:
    common bus means coupled to each of the function modules for transferring information to and from each of the function modules;
    scan path means for coupling respective ones of the function modules to each other in series;
    shift register means including a plurality of register circuits for temporarily storing information, each of said register circuits being coupled to said common bus means and being coupled in series to a corresponding one of the function modules, and each of said register circuits except a last one of said register circuits being coupled in series to a sequential one of said register circuits by said scan path means, each of said register circuits being adapted to temporarily store information for one of the function modules;
    detecting means coupled to said common bus means for detecting a failure of said common bus means and generating an error signal in response to said failure detection;
    control means coupled to said common bus means and to said detecting means, and coupled by said scan path means to a first and said last one of said register circuits, for transferring information to and from each of the function modules in parallel over said common bus means during absence of said error signal, and for transferring information to and from the function modules in series over said scan path means in response to said error signal.

2. A digital information transfer apparatus according to claim 1, wherein said control means includes:
    first circuit means for selectively applying information output from the last register circuit to a first one of said plurality of register circuits in response to said error signal; and
    second circuit means for shifting the information in each of said register circuits except said last register circuit to a respective sequential one of said register circuits in response to said error signal.

3. A digital information transfer apparatus according to claim 2, wherein the shifting means includes:
    clock means for generating clock pulses;
    an AND gate coupled to said clock means and to each of the register circuits for seletively supplying said clock pulses from said clock means to said register circuits; and
    means coupled to said AND gate for controlling said AND gate.

4. A digital information transfer apparatus according to claim 1, wherein said control means includes:
    means for generating a control signal in response to either of the error signal or a test instruction;
    means for selectively applying information output from the last register circuit to the first register circuit in response to said control signal; and
    means for shifting the information in each of said register circuits except said last register circuit to a respective sequential one of said register circuits in response to said error signal.

5. A digital information transfer apparatus according to claim 4, wherein the shifting means includes:
    clock means for generating clock pulses;
    an AND gate coupled to said clock means and to each of the register circuits for selectively supplying said clock pulses from said clock means to said register circuits; and
    means coupled to said AND gate for controlling said AND gate.

6. A digital information transfer apparatus according to claim 1, wherein the common bus means includes an address bus, a data bus, and a control bus.

7. A digital information transfer apparatus according to claim 1, including a scan path to couple the first and the last register circuits to the control means, and to couple sequential ones of said register circuits except said last register circuit in series to each other.

8. A digital information transfer apparatus according to claim 1, wherein said apparatus is formed on a semiconductor chip together with the function modules.

* * * * *